US009657156B2

(12) United States Patent
Strange et al.

(10) Patent No.: US 9,657,156 B2
(45) Date of Patent: May 23, 2017

(54) BRAID-REINFORCED COMPOSITES AND PROCESSES FOR THEIR PREPARATION

(75) Inventors: Andrew C. Strange, Worthington, OH (US); James E. McGuire, Jr., Columbus, OH (US)

(73) Assignee: entrotech, inc., Columbus, OH (US)

( * ) Notice: Subject to any disclaimer, the term of this patent is extended or adjusted under 35 U.S.C. 154(b) by 1718 days.

(21) Appl. No.: 12/066,262

(22) PCT Filed: Sep. 27, 2006

(86) PCT No.: PCT/US2006/037881
§ 371 (c)(1),
(2), (4) Date: Mar. 8, 2008

(87) PCT Pub. No.: WO2007/038674
PCT Pub. Date: Apr. 5, 2007

(65) Prior Publication Data
US 2008/0213490 A1 Sep. 4, 2008

Related U.S. Application Data

(60) Provisional application No. 60/721,401, filed on Sep. 28, 2005, provisional application No. 60/820,098, filed on Jul. 21, 2006.

(51) Int. Cl.
*D04H 1/00* (2006.01)
*C08J 5/24* (2006.01)
*C08K 3/36* (2006.01)
*C08K 3/22* (2006.01)
*C08K 7/06* (2006.01)

(52) U.S. Cl.
CPC ......... *C08K 3/36* (2013.01); *C08J 5/24* (2013.01); *C08K 3/22* (2013.01); *C08K 7/06* (2013.01);
(Continued)

(58) Field of Classification Search
CPC .......... B32B 9/00; B29C 53/00; C08G 59/14; D04H 3/00
(Continued)

(56) References Cited

U.S. PATENT DOCUMENTS 2,994,005 A 7/1961 Goss et al.
3,674,581 A * 7/1972 Kalnin et al. ................... 156/84
(Continued)

FOREIGN PATENT DOCUMENTS

WO WO-2007/038673 4/2007
WO WO-2009/041333 4/2009

OTHER PUBLICATIONS

"EPON Resin 862 Product Bulletin," Resolution Performance Products (Houston, TX) RP:4048 (Mar. 2005).
(Continued)

*Primary Examiner* — Jennifer Chriss
*Assistant Examiner* — Ricardo Lopez
(74) *Attorney, Agent, or Firm* — The Griffith Law Firm, A P.C.; Lisa M. Griffith

(57) ABSTRACT

Resin compositions of the invention are capable of effectively impregnating conventional braid forms and comprise at least one relatively low viscosity resin and at least one viscosity modifier. Hot-melt processing of such resin compositions and others imparts additional advantages and processing efficiencies when preparing braid-reinforced composites.

30 Claims, 4 Drawing Sheets

(52) U.S. Cl.
CPC .......... *C08J 2371/00* (2013.01); *Y10T 428/31* (2015.01); *Y10T 428/31504* (2015.04)

(58) Field of Classification Search
USPC ................ 523/457, 466, 467; 525/523, 107; 428/205, 365, 37, 36, 257
See application file for complete search history.

(56) References Cited

U.S. PATENT DOCUMENTS

| | | | |
|---|---|---|---|
| 4,081,578 A | 3/1978 | Van Essen et al. | |
| 4,320,047 A | 3/1982 | Murphy et al. | |
| 4,476,293 A | 10/1984 | Robinson | |
| 4,684,567 A | 8/1987 | Okamoto et al. | |
| 4,748,192 A | 5/1988 | Smith | |
| 5,389,435 A | 2/1995 | Yap | |
| 5,618,891 A * | 4/1997 | Markovitz | 525/481 |
| 5,679,719 A | 10/1997 | Klemarczyk et al. | |
| 5,768,285 A | 6/1998 | Griep et al. | |
| 5,849,168 A | 12/1998 | Lutz | |
| 5,874,151 A | 2/1999 | Cohee et al. | |
| 6,007,917 A * | 12/1999 | Weigel et al. | 428/408 |
| 6,045,898 A * | 4/2000 | Kishi et al. | 428/292.1 |
| 6,054,221 A | 4/2000 | Weigel et al. | |
| 6,063,839 A | 5/2000 | Oosedo et al. | |
| 6,287,696 B1 | 9/2001 | Noda et al. | |
| 6,383,644 B2 | 5/2002 | Fuchs | |
| 6,410,127 B1 | 6/2002 | Kamae et al. | |
| 6,515,081 B2 | 2/2003 | Oosedo et al. | |
| 6,518,389 B1 | 2/2003 | Kaufhold et al. | |
| 6,755,757 B2 | 6/2004 | Sutherland | |
| 7,005,103 B2 | 2/2006 | Smith et al. | |
| 2004/0044147 A1* | 3/2004 | Kamae et al. | 525/523 |
| 2007/0142548 A1* | 6/2007 | Nejhad et al. | 524/847 |
| 2008/0299395 A1 | 12/2008 | Strange et al. | |

OTHER PUBLICATIONS

"Epoxy Curing Agents and Modifiers: Ancamine 2441 Curing Agent," Air Products and Chemicals (Allentown, PA) Publication No. 125-04-017-GLB (2004).

"CAB-O-SIL TS-720," Cabot Corporation (Billerica, MA) PDS-141 (Jan. 2006).

"Epoxy Curing Agents and Modifiers: Amicure CG-1200 Curing Agent," Air Products and Chemicals (Allentown, PA) Publication No. 125-9416.7.

"Epoxy Curing Agents and Modifiers: Amicure UR Curing Agent," Air Products and Chemicals (Allentown, PA) Publication No. 125-9416.11.

"EPON Resin 828 Product Bulletin", Resolution Performance Products (Houston, TX) RP:3075-01 (Apr. 2002).

"EPON Resin Structural Reference Manual—Epon Resins—Epi-Cure Curing Agents—Heloxy Modifiers," Resolution Performance Products (Houston, TX), pp. 3i to 3-6 (2001).

"EPON Resin 863 Technical Data Sheet," Hexion Specialty Chemicals (Houston, TX) RP:4041 (Jun. 2004).

Castro, Jose M., "Development of an Environmentally Friendly Solventless Process for Electronic Prepregs," *J. Appl. Polym. Sci.*, 2003, 91(2), pp. 1136-1146 (2004).

"D.E.R. 332 Liquid Epoxy Resin Product Information Sheet," Dow Chemical Company, Form No. 296-01447-0106X-TD.

"Diethylenetriamine (EPI-CURE Curing Agent 3223) and Triethylenetetramine (EPI-CURE Curing Agent 3234)," *EPON Resin Structural Reference Manual*, Appendix 1, Resolution Performance Products, pp. 12-1 thru 12-5 (2001).

Sheppard, M. et al., "Lightweight, Damage Tolerant Composite Sandwich Structures for High Temperature Applications in Aircraft Engine Components," Sampe Technical Conference (Dayton, OH) (Sep. 2003).

Wang, Zhi et al., "Processing and Property Investigation of Single-Walled Carbon Nanotube (SWNT) Buckypaper/Epoxy Resin Matrix Nanocomposites," *Composites Part A: Applied Science and Manufacturing*, 35(10), pp. 1225-1232 (Jun. 5, 2004)—Abstract Only.

Graham, Kelly, "Solventless Prepreg Manufacturing Process," www.circuitree.com (Mar. 1, 2002).

"EPON Resins and Modifiers," Resolution Performance Products SC:3059-01 (2002).

"EPON Resins—Liquid Epoxy Resins and Resin Blends," Resolution Performance Products (May 31, 2002).

* cited by examiner

BRAID-REINFORCED COMPOSITES AND PROCESSES FOR THEIR PREPARATION

CROSS-REFERENCE TO RELATED APPLICATIONS

This application is a U.S. National Stage of PCT Patent Application No. PCT/US06/37881, filed on Sep. 27, 2006, which claims the benefit of U.S. Provisional Patent Application No. 60/820,098, filed on Jul. 21, 2006, and U.S. Provisional Patent Application No. 60/721,401, filed on Sep. 28, 2005.

BACKGROUND OF THE INVENTION

The present invention is directed toward braid-reinforced composites, resin compositions and processes for their preparation.

Braid-reinforced composites are useful in a variety of applications, particularly those benefiting from materials that are not only strong but also relatively lightweight. Despite the processing challenges presented thereby, braid is often the reinforcement of choice in composite materials that serve a wide variety of market applications.

For example, braid is used in aerospace applications like aircraft engine containment, aircraft propeller blades, missile nose cones and bodies, self-lubricating bearings, control surfaces, aircraft engine stator vanes, aircraft ducting and tubing and satellite components. Braid is typically the primary, load bearing reinforcement in automobile cross beams, automobile air bags and restraint devices, commercial furniture, industrial rollers, lamp and utility poles. Braid is often a partial reinforcement in structures like shipping containers and boat hulls. Braid is being used extensively for prosthetic limbs and orthotic braces, surgical devices like endoscopes and catheters and implantable devices such as splints and stents. Recreational equipment utilizing braided reinforcement includes wind surfing masts, snow boards, water skis, snow skis, wake boards, sail masts, boat hulls, hockey sticks, golf shafts, bicycle components, baseball bats, tennis and other racquets, and kayak and canoe paddles.

In addition to the benefits associated with its relative strength and weight, braid is commonly used in composites simply because it enables cost-efficient composite processing in certain applications. Braided reinforcements present composite fabricators with a variety of opportunities to be more cost effective because of their unique combination of attributes. For example, because of its "finger trap" configuration, biaxial braid easily and repeatably expands open to fit over molding tools or cores, accommodating straight, uniform cross-section forms as well as non-linear, irregular cross section components. Braid is, in essence, a near net-shape preform. Just as socks rolled up in a drawer do not look like feet, braids shipped on reels or festooned in cartons do not look like net shape preforms. However, just like pulling socks on your feet, braids slip onto tools and cores with speed, ease, and a high degree of repeatability.

At a fundamental level, a braid is a system of three or more fibers intertwined in such a way that no two fibers are twisted around one another. In practical terms, "braid" refers to a family of fibers continuously woven on the bias. Currently, there are four main braid forms and four main braid architectures available. The acute angle measured from the axis of the braid to the axis of the bias fibers is called the "braid angle." This angle is also referred to as the "fiber angle" or the "bias angle." The braiding process allows for the introduction of axial fibers between the woven bias fibers. These axial fibers are generally not crimped by the weaving process.

Braided fiber architectures resemble a hybrid of filament winding and weaving. Like filament winding, a tubular braid features seamless fiber continuity from end to end of a part. Like woven materials, braided fibers are mechanically interlocked with one another. The combination, however, is quite extraordinary. When functioning as a composite reinforcement, braid is capable of exhibiting remarkable properties because it is highly efficient in distributing loads. Because all the fibers within a braided structure are continuous and mechanically locked, braid has a natural mechanism that evenly distributes load throughout the structure.

Braid's efficient distribution of loads also makes braided structures very impact resistant. Since all the fibers in the structure are involved in a loading event, braid has the capacity to absorb a great deal of energy in the event of a failure. This is why braid is used as fan blade containment in commercial aircraft and in energy absorbing crash structures in formula one racing cars.

Braided structures are also excellent with respect to fatigue. Like a filament wound structure, braided fibers are coiled into a helix just like wire in a spring. The difference, however, is the mechanical interlocking. As a structure is exposed to high fatigue cycles, cracks will propagate through the matrix of filament wound structures. While micro-cracking can occur in a braided structure, the propagation is typically arrested at the intersections of the reinforcing fibers. This is why braid is the reinforcement of choice for aircraft propellers and stator vanes in jet engines.

Braid greatly improves interlaminar shear properties when nested together with other braids. While interlaminar adhesion is typically no different from other reinforcement products, the layers move together. As a result, it is very rare for cracks to form and propagate between layers of braided reinforcement. Since braids are woven on the bias, they provide very efficient reinforcement for parts that are subjected to torsional loads. As such, braid is an ideal reinforcement for drive shafts and other torque transfer components such as flanged hubs.

Despite all of their potential and capabilities, braid-reinforced composites present unique processing challenges. In preparing braid-reinforced composites, a braid form must be impregnated with a suitable resin. Without adequate and uniform impregnation, properties of the resulting braid-reinforced composites are compromised. There exists a continued need for improving the process and materials used for formation of braid-reinforced composites in order to maximum the potential benefits thereof.

Essential to formation of a braid-reinforced composite is inclusion of at least one braid. Braid is most commonly manufactured and used as a freestanding form with a constant braid angle for a given diameter. In this form, it is supplied on reels or festooned in cartons. In composite manufacturing, tubular braids are typically expanded open diametrically, applied to a molding tool or core, snugged down using the "finger trap" effect, impregnated with resin and then consolidated. During pultrusion, tubular braids are continuously fed over a die mandrel to produce hollow cross sections impregnated with resin. Flat braids are used primarily for selective reinforcement, such as tabbing in boat building and strengthening specific areas in pultruded profiles.

Adequate and uniform impregnation of braid forms is challenging, but important. For example, voids in the fully cured product (which can be introduced, for example, due to volatilization of solvents or inadequate impregnation of resin into the braid) are often areas of stress concentration that can contribute to premature failure of the reinforced composite when under an applied stress.

In an effort to overcome the difficulties in obtaining adequate infiltration of the resin through the complex arrangement of fibers within a braid, fiber tows have first been coated with the resin and then braided. However, this method has not proven sufficient to efficiently and adequately braid fibers coated with a resin when the resin has too much tack or inflexibility. Further, this method requires that the user have access to not only resources for impregnating the fibers forming the braid, but also the resources for arranging the fibers into a braid form. Thus, obviously formulation and processing latitude is constricted when using this method.

Some of the above-noted disadvantages are overcome by impregnating resin onto pre-braided fiber forms. According to these efforts, an initial resin is coated onto the braided form. Often, the initial resin is a B-stage thermosetting resin that forms a prepreg once combined with the braided form. As is well known in the art of prepreg manufacture, B-stage refers to an intermediate stage in the reaction of certain thermosetting resins, in which the resin swells when in contact with certain liquids and softens when heated, but may not entirely dissolve or fuse. B-stage thermosetting resins are generally needed to facilitate transportation and maintenance of such a prepreg structure until final cure of the thermosetting resin in conventional fiber-reinforced composites. After configuration of such a prepreg into its intended structure, the thermoset resin of the prepreg is fully cured to a state having essentially irreversible hardening and insolubility.

Nevertheless, efforts to impregnate resin into pre-braided fiber forms have also not proven sufficient to efficiently and adequately achieve products having the intermediate and final properties desired. Although mixtures of thermosetting resin and its associated curative can be heated to a temperature sufficient to decrease their viscosity and improve fiber impregnation, when the curative is heat-activated this process may result in premature cure of the thermosetting composition if not handled appropriately. The type of curative used may also make it impractical to heat the composition to the necessary temperature for imparting the desired viscosity.

Also, while lower viscosity compositions facilitate more rapid and adequate impregnation of pre-braided fiber forms, there is a competing need for the resin coating impregnated on the braid to remain substantially and uniformly impregnated throughout the braid until final curing. To facilitate this need, upon impregnating the resin composition on the fibers, it is typically at least partially cured (e.g., to a B-stage). However, B-stage resins are generally less flexible than resins that have not been at least partially cured; and, as noted above, one of the advantages of a braid is its sock-like flexibility. Therefore, it is desirable to retain that flexibility even when the braid is impregnated with a resin during preparation of braid-reinforced composites. Without that functionality, it is more difficult to process intermediate braid-reinforced resin articles into final braid-reinforced composites.

Conventional prepregs are often made using solvent-based methods. According to solvent-based methods, viscosity of the resin system is decreased by the addition of sufficient amounts of solvent to enable adequate impregnation of the fibers. While this method facilitates fiber impregnation without the use of heat, the solvent is typically removed subsequently via heating. Generally, the use of solvents makes the process more expensive, less environmentally friendly, and potentially hazardous. Furthermore, the use of a solvent-based method can result in the undesirable retention of solvent within the final prepreg product. During subsequent cure of the prepreg product, residual solvent is prone to volatilization (e.g., upon heating). Volatilization of the solvent can create unwanted voids within the final composite laminate.

Hot-melt processing is an alternative method that has been used when forming conventional prepregs. Not surprisingly, methods of this type are often preferred as compared to solvent-based methods. However, because conventional prepregs are often based on resins having a relatively high viscosity, heat in excess of 60° C. is often needed to sufficiently reduce the viscosity so that the resin can adequately infiltrate the fibers during formation of the prepreg using hot-melt processing techniques. Yet, as discussed above, when the resin's curative is heat-activated this process may result in premature cure of the thermosetting composition if not handled appropriately. Thus, the type of curative used may make it impractical to heat the composition to the necessary temperature for imparting the desired viscosity.

While known efforts, such as those described above, may result in fiber-reinforced composites useful for certain applications, adequate braid-reinforced composites are not known to be readily available and useful. Not surprisingly, those skilled in the art are challenged to produce braid-reinforced composites efficiently and in a way that maximizes the benefits obtainable by use of complex fiber forms such as braids.

BRIEF SUMMARY OF THE INVENTION

Resin compositions of the invention facilitate improved impregnation of intermediate pre-braided fiber forms when forming braid-reinforced composites. The resin compositions are capable of impregnating conventional braid forms and comprise at least one relatively low viscosity resin and at least one viscosity modifier. The initial resin can be a thermosetting resin, a thermoplastic resin, or a combination thereof. Preferably, the initial resin comprises a thermosetting resin (e.g., an epoxy resin). Preferably, the viscosity modifier comprises a thixotropic agent (e.g., fumed silica) or a nanomaterial (e.g., carbon nanomaterial). Also preferred are those resin compositions exhibiting Bingham plastic fluid behavior.

Resin compositions of the invention can be used to make improved braid-reinforced composites. Invention of the improved resin compositions has also led to the discovery of new methods for preparing braid-reinforced composites. While use of resin compositions of the invention is preferred, other conventional resin compositions (e.g., those typically used for prepreg) can be used in methods of the invention as well.

Hot-melt processing of the resin composition imparts additional advantages and processing efficiencies when processing braid-reinforced composites. Resin injection is one exemplary method for hot-melt processing of the resin composition during impregnation of braid forms according to the invention. While certain efficiencies are realized by injecting resin into the braid form at a positive flow rate, other embodiments of the invention sufficiently impregnate braid forms by subjecting them to a bath of the resin composition for an amount of time to obtain impregnated braid forms. Such baths can optionally be heated.

In one embodiment, during impregnation, outward pressure is exerted from within a braid form to facilitate opening and filling of interstices existing between individual fiber tows within the braid form. Outward pressure can be induced using a variety of methods and apparatus. In an exemplary embodiment, the outward pressure is imparted simply by placement of an object having a larger diameter than the core of the braid form. In this embodiment, the longitudinally stretched braid form is drawn over the object (e.g., ball, ring, disk, or the like) within its core to locally increase the braid form's diameter, which was found to improve interstitial filling.

Despite the use of a relatively low viscosity resin composition, once impregnated onto a braid form, the resin composition generally remains impregnated throughout the braid form until final curing. Partial curing (e.g., B-staging) of the resin composition impregnated on the braid form, which has a tendency to decrease flexibility of the braid-reinforced resin composition, is not required. In exemplary embodiments, the resin composition remains essentially uncured until final cure of the braid-reinforced resin composition. Thus, more efficient processing of intermediate braid-reinforced resin articles into final braid-reinforced composites is made possible according to the invention.

BRIEF DESCRIPTION OF THE DRAWINGS

Note that the components and features illustrated in all figures throughout this application are not necessarily drawn to scale and are understood to be variable in relative size and placement. Similarly, orientation of the components and features within the figures can vary such that, for example, a horizontal configuration could be readily reoriented to a vertical configuration as desired.

DETAILED DESCRIPTION OF THE INVENTION

Figure 1A:
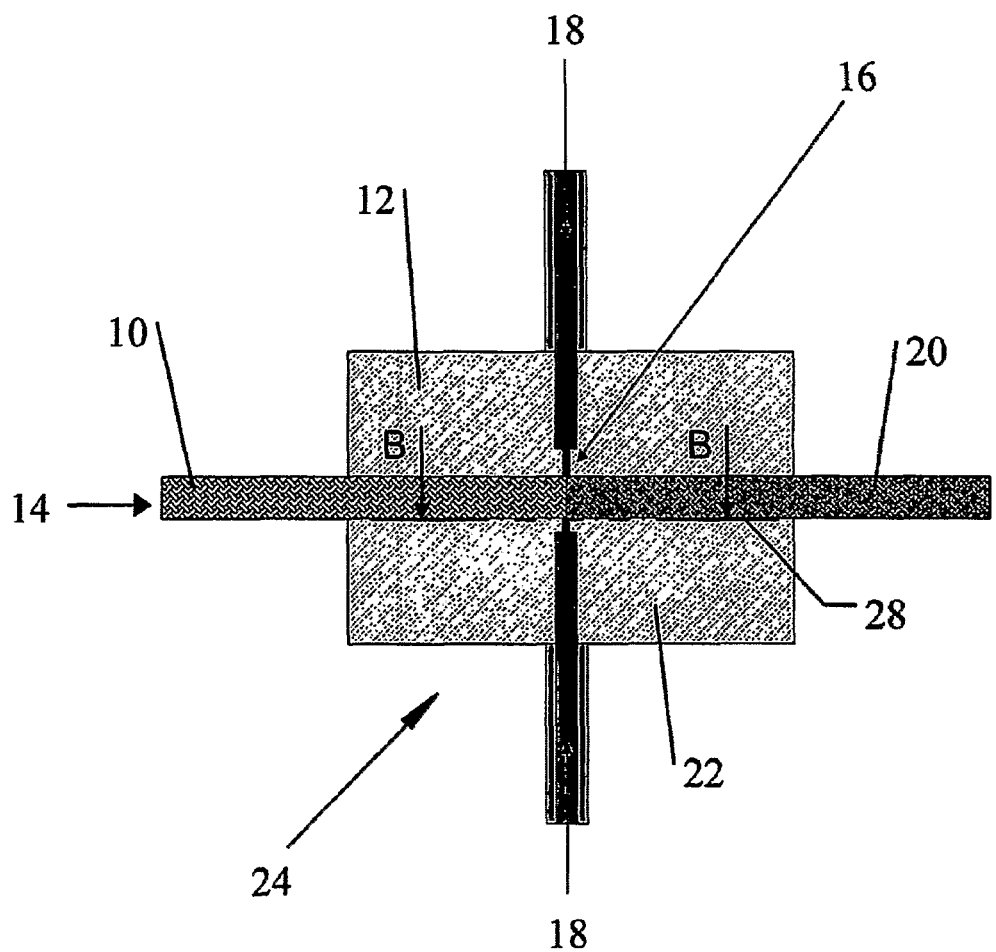
FIG. 1A is a partial schematic of an exemplary embodiment of a process and processing equipment for impregnation of braid forms according to the invention.

According to the invention, an initial resin having relatively low viscosity (comparable to the usually higher viscosity of traditional resins used to impregnate fibers during preparation of braid-reinforced composites) is adapted for preparation of braid-reinforced composites according to the present invention. In further embodiments, the initial resin also has relatively low tack as compared to traditional resins typically used. Resin compositions of the invention have a unique balance of properties that allow for both effective impregnation of braid forms as well as stable retention thereon until final curing to a braid-reinforced composite article. Given the unique attributes of resin compositions of the invention, partial curing of the resin composition (e.g., B-staging) is not necessary, thus providing beneficial improvements in flexibility of intermediate braid-reinforced resin compositions.

Unlike conventional resin compositions, compositions of the invention have the viscosities needed for effective impregnation of fiber reinforcements, particularly braid forms, which are known to pose particular processing challenges. This is accomplished without negatively impacting the resin composition's ability to remain sufficiently dispersed throughout the braid form until subsequent cure of the resin. As such, benefits are realized during shipping and storage of such braid-reinforced resin composition due to the composition's relative stability as compared to what would be expected based on the use of such relatively low viscosity resins. Further, when curing the braid-reinforced resin compositions, undesired run-out of the resin composition from the braid form is minimized using compositions and processes according to the invention. In other words, the resin composition is essentially "flow-stable" during cure.

As the initial resin used to impregnate fibers during preparation of braid-reinforced composites, thermosetting resin and/or thermoplastic resin can be used. As the thermosetting resin, the following are exemplary resins: unsaturated polyester resin, cyanate ester resin, vinyl ester resin, phenol resin, melamine resin, urea resin, diallyl phthalate resin, polyurethane resin, polyimide resin, malemide resin, and silicon resin. As the thermoplastic resin, the following are exemplary resins: polyamide resin, saturated polyester resin, polycarbonate resin, ABS resin, polyvinyl chloride resin, polyacetal resin, polystyrene resin, polyethylene resin, polyvinyl acetate resin, AS resin, methacrylate resin, polypropylene resin, and fluorine resin.

Thermosetting resins and thermoplastic resins can be used singly or in combination as the initial resin. Considering strength and rigidity, however, thermosetting resins are preferable even though processing of thermosetting resins for braid-reinforced composites is challenging and if not handled correctly, can compromise desired properties of the resultant braid-reinforced composite.

Of the wide variety of useful thermosetting resins, epoxy resins are particularly favorable. The most common epoxy resin types include those based on diglycidyl ether of Bisphenol A and the epoxy novolacs (comprised of glycidyl ethers of cresol novolac, phenolic novolac, or Bisphenol A novolac). However, the present invention provides for use of lower viscosity epoxy resins, such as those based on the diglycidyl ether of Bisphenol F. As compared to a typical epoxy resin based on diglycidyl ether of Bisphenol A (i.e., EPON 826 available from Resolution Performance Products of Houston, Tex.), exemplary lower viscosity epoxy resins of the present invention (i.e., EPON 862 and EPON 863 also available from Resolution Performance Products), which are based on diglycidyl ether of Bisphenol F, are reported to have a viscosity of 2.5-4.5 Pa·s (25-45 Poise) as compared to 6.5-9.6 Pa·s (65-96 Poise) when tested at 25° C. Another example of a Bisphenol F-derived epoxy resin is EPALLOY 8230, available from CVC Specialty Chemicals, Inc. of Moorestown, N.J. The reported viscosity of EPALLOY 8230 epoxy resin is 2.5-4.7 Pa·s (2,500-4,700 centipoise).

In one embodiment, the initial resin has a viscosity of less than about 6 Pa·s (60 Poise) when tested at 25° C. In another embodiment, the initial resin has a viscosity of less than about 5 Pa·s (50 Poise) when tested at 25° C. In another embodiment, the initial resin has a viscosity of about 2.5 Pa·s (25 Poise) to about 4.5 Pa·s (45 Poise) when tested at 25° C.

Generally, when a thermosetting resin is used, a curative is needed to effectuate final cure of the braid-reinforced resin composition to the braid-reinforced composite. Any suitable curative can be used in resin compositions of the invention.

As known to those skilled in the art, different curatives impart various advantages when used. For example, in epoxy systems, aliphatic amine curatives allow for room-temperature cure, whereas aromatic amines offer optimal chemical resistance and more rigid final parts. As another example, acid anhydride curatives can provide superior electrical properties. It is to be understood, however, that selection of the curative depends, among other well known factors, on curing conditions desired and the intended application. In an exemplary embodiment, at least one curative is used that facilitates cure of the resin composition within about 45 to about 60 minutes when heated to about 120° C. (250° F.).

An exemplary class of curatives useful for curing of epoxy resins is the modified aliphatic amine curatives such as those available from Air Products and Chemicals, Inc. of Allentown, Pa. under the ANCAMINE trade designation. In that class, ANCAMINE 2441 curing agent is particularly useful in exemplary resins according to the invention.

Another class of curatives includes dicyandiamides, optionally with the use of common accelerators. For example, a useful combination is OMICURE DDA 5, an ultra-micronized grade of dicyandiamide, and OMICURE U-52, an aromatic substituted urea used as an accelerator for dicyandiamide cure of epoxies (both available from CVC Specialty Chemicals, Inc. of Moorestown, N.J.). Another useful combination is AMICURE CG-1400, a micronized grade of dicyandiamide, and AMICURE UR, a substituted urea-based accelerator (1 phenyl 3,3 dimethyl urea) for dicyandiamide-cured epoxy resins (both available from Air Products and Chemicals, Inc. of Allentown, Pa.).

Any suitable amount of the curative is used in resin compositions of the invention. Generally, after the specific type of curative is selected, the amount used is calculated as is well known to those skilled in the art.

Relatively low viscosity initial resins used in the invention are adapted for use in preparation of braid-reinforced composites by addition of one or more viscosity modifiers. Any suitable viscosity modifier can be used in the invention, with the understanding that such viscosity modifiers differ from common diluents.

Common diluents may be included in the resin compositions, but their presence—particularly in significant amounts—is generally not preferred. While common diluents can be used to reduce a resin composition's viscosity, their presence in the final cured resin may negatively impact its properties due to the tendency of conventional diluents to make such cured resins too flexible and soft for some applications. Common diluents include, for example, non-reactive diluents and reactive diluents. Certain reactive diluents include glycidyl ethers and glycidyl esters, including those available from Resolution Performance Products of Houston, Tex. under the trade designation, HELOXY MODIFIER. Exemplary reactive diluents available from Resolution Performance Products include HELOXY MODIFIER 71 (dimer acid diglycidyl ester), HELOXY MODIFIER 107 (cyclohexane dimethanol diglycidyl ether), and HELOXY MODIFIER 505 (castor oil polyglycidyl ether).

In one embodiment, the viscosity modifier comprises a thixotropic agent that increases the viscosity of the resin, yet imparts shear thinning properties as well. When used with a hot-melt process for impregnation of a braid form, compositions of this type were capable of displaying particularly preferred viscosity characteristics. An exemplary viscosity modifier for this purpose is fumed silica, such as that available from Cabot Corporation of Billerica, Mass. under the trade designation, CABO-SIL TS-720. Cabot Corporation; PPG Industries of Pittsburgh, Pa. (marketed under the trade designation, HI-SIL); and Degussa Corporation of Parsippany, N.J. (marketed under the trade designation, AEROSIL) also provide fumed silica suitable for use in the present invention. The fumed silica can be treated (e.g., so that it is hydrophobic) or it can be untreated.

In another embodiment, the viscosity modifier comprises a nanomaterial. A nanomaterial is a material generally understood to be readily measurable on the nanoscale. According to one aspect of this embodiment, nanomaterials have a relatively large surface area in relation to their volume. Any suitable nanomaterial can be used as a viscosity modifier according to the present invention. Preferred nanomaterials for use in the present invention include those comprising particles having at least one primary dimension (e.g., diameter, width, or length) of less than about 500 nanometers. As long as one dimension of the particle is less than about 500 nanometers, other dimensions of the preferred nanomaterials may be larger in size. Particularly preferred nanomaterials include those based on carbon—e.g., carbon nanotubes and carbon nanofibers. One example of carbon nanofibers are those available from Applied Sciences, Inc. of Cedarville, Ohio, and marketed under the trade designation, Pyrograf-III.

In addition to their function as viscosity modifiers, nanomaterials may be preferred for certain applications as they are often capable of imparting additional functional properties to the resin composition. For example, nanomaterials can improve the toughness of the cured resin composition. In other instances, nanomaterials can beneficially alter the thermal and/or electrical properties of the cured resin composition. Thus, according to a further aspect of this embodiment of the invention, the nanomaterials serve two purposes—serving as a viscosity modifier and imparting at least one additional functional property to the resin composition.

While having thixotropic properties assists in allowing the resin composition to be coated (i.e., impregnated) into the braid form, thixotropic properties alone may not be sufficient to ensure that the resin composition does not flow out of the braid form when in storage or during subsequent processing. To reduce the possibility that the resin composition could undesirably flow out of the braid form, it should preferably also exhibit Bingham plastic fluid behavior. Resins exhibiting Bingham plastic fluid behavior generally do not flow until a certain threshold stress (i.e., a yield stress) is applied to the material. A common way to observe whether a material exhibits such a yield stress is to invert a jar of the material. If the material does not begin to flow within a few minutes, it can be characterized as exhibiting Bingham plastic fluid properties.

Any number of viscosity modifiers can be combined in varying proportions to form the viscosity modifier component of resin compositions of the invention. The total amount of the viscosity modifier component is that amount effective to increase the viscosity of the initial resin without detrimentally affecting flexibility of the resin-impregnated braid prior to cure of the resin. According to one embodiment of the invention, at least 1% by weight of the total resin composition comprises one or more viscosity modifiers. According to a further aspect of this embodiment, about 2% to about 7% by weight of the total resin composition comprises one or more viscosity modifiers. In particularly preferred embodiments, about 5% by weight of the total resin composition comprises one or more viscosity modifiers.

Without departing from the spirit and scope of the invention, other components may be present in resin compositions of the invention, recognizing that properties of the resin composition and resultant braid-reinforced composites may be influenced by the type and amount of such components. Adjustments as known to those skilled in the art can be made to achieve results desired for each particular application.

Although glass transition temperature of the resin composition can vary across a broad spectrum, in exemplary embodiments of the invention, the resin composition has a glass transition temperature of less than about 200° C. as measurable using Differential Scanning Calorimetry known to those skilled in the art. In further embodiments, the resin composition has a glass transition temperature of less than about 175° C. when so measured. In still further embodiments, the resin composition has a glass transition temperature of less than about 150° C. when so measured.

In one embodiment, the resin composition has relatively low tack. In many cases, conventional detackifying resins can be included in the resin composition without detrimentally affecting the resin composition's ability to be used in preparing braid-reinforced compositions and intermediate braid-reinforced resin compositions of the invention. Detackifying resins include, for example, waxes, fatty acids, and other release agents. In certain embodiments, it is preferable to include such components to minimize tendency of the intermediate braid-reinforced resin composition to collect dirt and/or require special packaging before final cure of the resin composition.

In further embodiments of the resin composition of the invention, it is preferable to add a minor amount of a toughening agent (also referred to as an elastomeric component). For example, up to about 10 parts of a rubber toughening agent based on 100 parts by weight of the resin can be present in resin compositions of the invention. According to further embodiments, up to about 5 parts of a rubber toughening agents based on 100 parts by weight of the resin is used. Those of ordinary skill in the art are readily able to select the types and amounts of such toughening agents depending on the properties desired. It is known to those skilled in the art that addition of elastomeric toughening agents generally increases the viscosity of a composition. Advantageously, however, due to the relatively low viscosity of resin compositions of the invention as compared to those associated with resins conventionally used in fiber-reinforced prepregs, one is able to add more of such toughening agents to a resin composition before it attains the same viscosity—one where workability is substantially compromised. Thus, formulation latitude is improved in regards to the types and amounts of other components that can be used in resin compositions of the invention.

In the case of elastomeric toughening agents, addition thereof often advantageously improves the cured resin's facture toughness. In other embodiments, it may be advantageous to use a functional resin adduct that has been modified with an elastomeric component. Such functional resin adducts are often useful because they can be cross-linked into the primary resin composition in relatively small amounts without modifying the overall cure properties or the viscosity of the resin composition. Examples of such functional resin adducts include epoxy adducts modified with carboxyl-terminated butadiene-acrylonitrile elastomers, such as EPON 58034 and EPON 58042 (available from Hexion Specialty Chemicals, Inc. of Houston, Tex.) or HyPox RF 1320 and HyPox RF 1341 (available from CVC Specialty Chemical, Inc. of Moorestown, N.J.). Additional examples include the elastomeric particulate tougheners available from Zeon Chemicals of Louisville, Ky. (marketed under the trade designation DuoMod).

Beneficially, resin compositions of the invention are capable of being used to impregnate braid forms, which can be cured to form braid-reinforced composites. In an exemplary embodiment, the resin composition remains essentially uncured until final cure of the braid-reinforced resin composition. As such, intermediate braid-reinforced resin compositions of the invention were found to have excellent workability in that they are capable of maintaining the sock-like flexibility associated with uncoated braid forms (i.e., "dry braid").

Any suitable braid can be used in accordance with the present invention. Virtually any fiber with a reasonable degree of flexibility and surface lubricity can be economically braided. Typical fibers include, for example, aramid, carbon, ceramics, fiberglass, natural fibers, synthetic fibers, thermoplastics, and combinations thereof. In an exemplary embodiment, the braid comprises carbon fibers.

To maximize benefits of the invention, hot-melt processing of the resin composition to impregnate a braid form is generally preferred. The use of hot-melt processes and associated equipment (described further below) is preferred as opposed to use of conventional prepreg fabrication equipment and uni-tape fabrication equipment, which often rely heavily on web handling equipment that is not capable of handling materials having relatively small widths and multiple layers (e.g., those associated with braid forms). Further, hot-melt processing is preferable to solvent-based processing based on a number of well known factors, including the above-described tendency for voids to form in the resultant composite when the resin is impregnated using solvent-based processing.

Any suitable hot-melt processing method can be used to impregnate braid forms according to the invention. "Hot-melt processing" refers to processing of essentially 100% solid systems. "Hot-melt processable" refers to those systems that can be, but are not required to be, impregnated onto a braid form using hot-melt processing. Usually, hot-melt processable systems have no more than about 5% organic solvents or water, more typically no more than about 3% organic solvents or water. Most typically, such systems are free of organic solvents and water. Wide varieties of hot-melt processing methods are known, including spray coating and dip coating methods. In an exemplary embodiment, a resin injection hot-melt processing method is adapted for impregnation of braid forms.

For impregnation, the braid form can be positioned in any suitable manner to achieve the desired results. In an exemplary embodiment, the braid form is placed under tension during impregnation so that its length increases while its diameter decreases. This is accomplished by pulling the braid form (longitudinally in tension) through processing equipment where impregnation occurs.

In one embodiment, the braid form is pulled in tension until it is essentially in tensile jam, where the braid fibers are literally jammed together so that they can not move any further. The point at which tensile jam is reached depends on the dimensions of the braid form. For example, when a 3.8-centimeter (1.5-inch) diameter braid is pulled in tension, the diameter of the braid will generally decrease to about 1.3 centimeters (0.5 inch). When the extended braid form is further flattened, it takes the form of a tape having a width of about 1.9 centimeters (0.75 inch) and thickness of about 1.3 millimeters (0.05 inch). The stretched braid need not be flattened to a form resembling a tape, but rather a stretched braid form resembling a tube (that has not been flattened) can be further processed instead.

Unique to braid forms is the fact that essentially two layers of material must be impregnated concurrently versus one layer that is common to processing of conventional fabrics or unidirectional mats of fiber. Resin injection equipment developed by Dr. Jose M. Castro at The Ohio State University, as described in his publication entitled "Development of an Environmentally Friendly Solventless Process for Electronic Prepregs," *J. Appl. Polym. Sci.*, 2003, 91(2), 1136-46, was modified for use according to one embodiment of the present invention pertaining to impregnation of more complicated braid forms. The teachings of Dr. Castro's articles were limited to impregnation of a single layer of glass fabric.

Notably, unlike that of the conventional prepreg compositions described in Dr. Castro's article as being so processed, B-staging of the resin compositions according to the present invention is not required. As discussed herein, the ability to utilize a resin composition that does not require B-staging for maintaining impregnation of complicated braid forms is beneficial. Nevertheless, the resin injection hot-melt processing method of the invention is applicable to processing of braid-reinforced composites using not only resin compositions of the invention, but a wide variety of other resin compositions. For example, despite the advantages realized when using resin compositions of the invention, conventional resin compositions having a higher viscosity than those described herein can be used with the methods of the invention.

FIG. 1A is a general schematic of an exemplary embodiment of a process and processing equipment for impregnation of braid forms according to the invention. As shown therein, a dry braid form 10 is moved through vertically and horizontally adjustable first and second portions 12 and 22, respectively, of die block 24 in general direction 14. The die block 24 is adjustable in a first position to accommodate variable thicknesses of the braid form 10 pulled in tension therethrough. The die block 24 is typically further adjustable in a direction orthogonal to the first position in order to accommodate variable widths of the braid form 10 pulled therethrough.

Figure 1B:
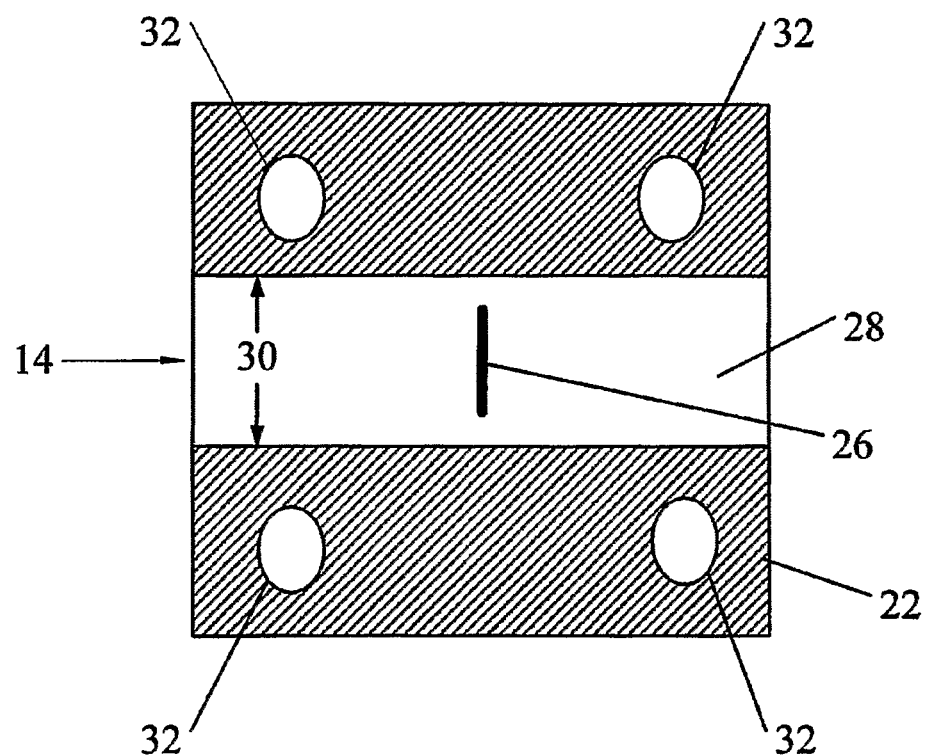
FIG. 1B is partial cross-sectional view of the die block of FIG. 1A taken along plane B-B.

A partial cross-sectional view of die block 24 taken along plane B-B of FIG. 1A is shown in FIG. 1B. As illustrated therein, braid conduit 28 allows for horizontal adjustment of width 30. Fasteners 32 facilitate both horizontal and longitudinal adjustment of the braid conduit 28 based on positioning of first and second portions 12, 22 of die block 24.

As the dry braid form 10 moves along braid conduit 28 and past at least one resin injection port 26 at approximate position 16, it becomes impregnated with a resin composition 18 of the invention, which is essentially free of organic solvents. A braid-reinforced resin composition 20 then continues its movement through first and second portions 12, 22 to exit the die block 24.

Optionally, the die block 24 can be sufficiently heated after the resin injection is performed at approximate point 16 as described in Dr. Castro's article if at least partially curing of the resin composition is desired at that stage. Alternatively, the braid-reinforced resin composition 20 can be conveyed through an oven after exiting the die block 24 to at least partially cure the resin. Recognize, however, that even partial curing of the resin composition generally decreases workability (i.e., flexibility) of the braid-reinforced resin composition. Thus, these variations in processing are not generally preferred based on the unique balance of properties provided by resin compositions of the present invention, which do not require such processing.

Processes of the invention need only include one resin injection port 26 according to this embodiment. However, processing efficiencies are generally increased when more than one resin injection port 26 is utilized. In one embodiment, at least two resin injection ports 26 are included—on opposite sides of the braid conduit 28 in first and second portions 12, 22 of die block 24—at approximate position 16. Each resin injection port 26 includes at least one opening, which is preferably variable in size and/or shape to alter flow and injection pressure of the resin composition 18 as needed during processing. The resin injection port 26 can include one or more openings that are shaped as slots or other holes, for example.

In one embodiment (not illustrated), the resin injection port 26 includes a series of small holes as openings. The openings can be any suitable shape such as, for example, circles, ovals, squares, rectangles, parallelograms, diamonds, and the like. In another embodiment, such as that illustrated in FIG. 1B, the resin injection port 26 is a slot having a length of about 1.9 centimeters (0.75 inch) and a width of about 0.38 millimeters (0.015 inch). The length of the slot is oriented perpendicular to the direction 14 of movement of the braid form 10 through the die block 24. In alternative embodiments, the length of the slot is oriented up to about a 90° angle with respect thereto.

Operatively coupled to each resin injection port 26 according to this embodiment is a pump (not shown) for compelling the resin composition 18 to and through the resin injection port 26 from a transfer pot (also not shown). In the transfer pot, or as it is conveyed to and through the resin injection port 26, the resin composition 18 can be heated to temporarily decrease its viscosity even further for more efficient impregnation of the braid form 10. If heated, temperature of the resin composition 18 is controlled so as to lower its viscosity without prematurely curing the resin. Preferably, temperature of the resin composition 18 is maintained below that at which curing of the resin is initiated. The resin curing temperature depends on the types of resin and curatives present in the resin composition. In one embodiment, the temperature of the resin composition 18 is maintained at about room temperature (about 22° C. to about 25° C.) or above. In further embodiments, the temperature of the resin composition 18 is maintained at less than about 100° C. However, it is to be understood that the temperature of the resin composition 18 can vary depending on the application and curative used therein.

Further, pressure of the resin composition 18 is controlled to achieve adequate and efficient impregnation of the braid form 10. Pressurized resin injection is not required, but can help facilitate more efficient impregnation of braid forms when using initial resins of higher viscosity. Further, pressurization of the resin composition during injection can facilitate more uniform impregnation of the braid form and elimination of air pockets in the resin composition that can detrimentally impact properties of the resulting braid-reinforced composite.

Pressure of the resin composition 18 exiting the resin injection port 26 according to this embodiment is a function of the pressure of the resin composition 18 within the feed lines leading to and the cross-sectional area of the resin injection port 26 openings. In one embodiment, pressure of the resin composition 18 exiting the resin injection port 26 is up to about 410 MPa (about 60,000 psi). In a further exemplary embodiment, pressure of the resin composition 18 exiting the resin injection port 26 is about 70 MPa to about 210 MPa (about 10,000 psi to about 30,000 psi).

However, the pressure can be higher or lower than these ranges depending on the application and desired processing parameters.

Flow rate of the resin composition 18 according to this embodiment is controlled to achieve adequate and efficient impregnation of the braid form 10. Faster manufacturing is facilitated when higher flow rates are used. Flow rate generally increases with increasing cross-sectional area of the resin injection port 26 openings. However, in order to maintain the desired pressure of the resin composition 18 exiting the resin injection port 26, pressure of the resin composition 18 within the feed lines will generally need to be adjusted to accommodate any adjustments being made to vary the resin composition's flow rate.

According to a further aspect of this embodiment, the die block 24 is mounted on conventional web handling equipment such as that known as WEBTRON 650, available from Webtron of Glenview, Ill. The web handling equipment conveys the braid form 10 through the die block 24 at a certain speed and resin composition 18 is injected at a certain flow rate and temperature. In this manner, flat braid up to about 13 centimeters (5 inches) in width can be impregnated with the resin composition 18 at rates in excess of about 30 meters per minute (about 100 feet per minute). Conveying the braid form 10 at rates of about 3 meters per minute (about 10 feet per minute) to about 9 meters per minute (about 30 feet per minute), however, is sufficient for many applications. Adjustments are made depending on the desired application and as understood by those skilled in the art.

According to a further embodiment of this method of the invention, at least one bath containing the resin composition 18 is used to assist in impregnating the braid form 10. As understood by those skilled in the art, the number, size, shape, and placement of such resin baths can vary. The braid form 10 can be immersed in the resin bath in a separate progression or, preferably, as part of a continuous process for impregnation of the braid form 10.

Figure 1C:
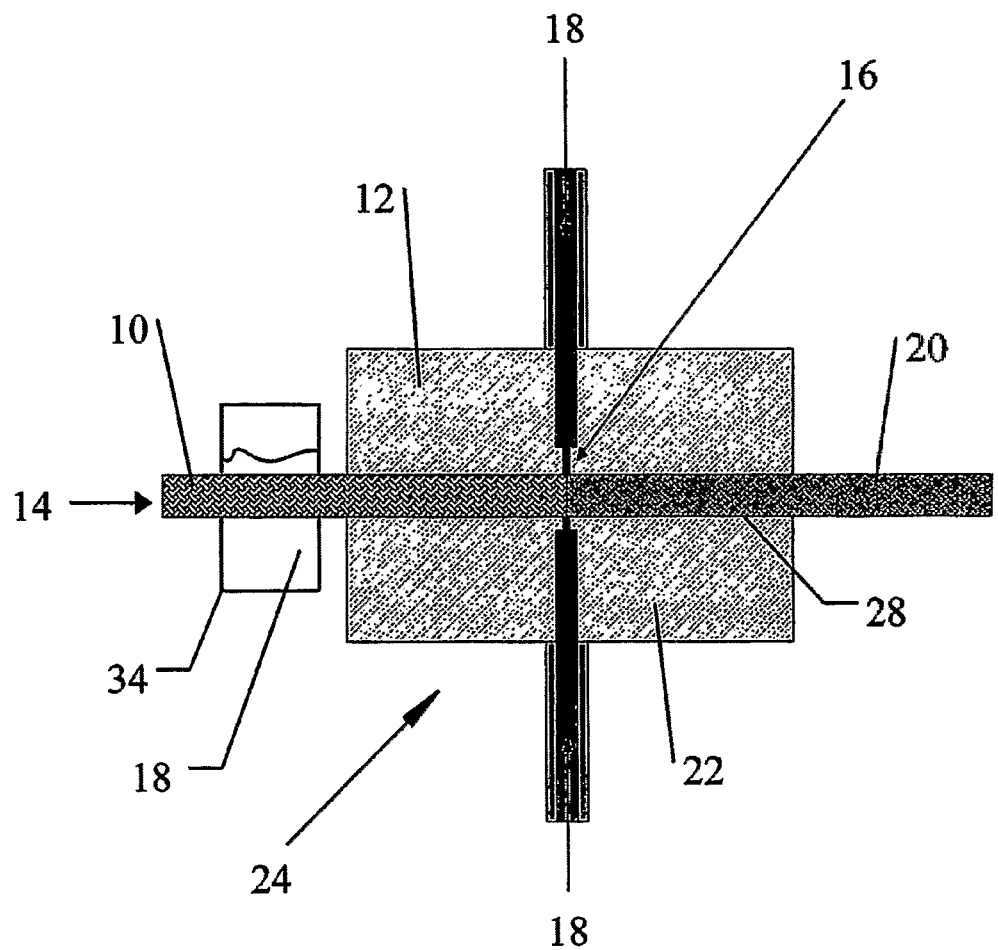
FIG. 1C is a partial schematic of a further embodiment of the process and processing equipment for impregnation of braid forms illustrated in FIG. 1A, wherein a resin bath is used to further improve processing efficiency.

For example, in a continuous process such as that illustrated in FIG. 1C, a resin bath 34 can be positioned outside the die block 24 in such a manner that it is fluidly isolated from the resin injection chamber, which injects resin composition 18 within the die block 24 through at least one reason injection port 26. In alternative embodiments, the resin bath is fluidly coupled to at least one resin injection port 26 within the die block 24. According to the latter embodiment, flow from the resin bath may provide sufficient resin composition 18 to the resin injection port 26 without the need for injection. For example, the flow provided from the resin bath can be that based on higher vertical positioning of the resin bath as compared to the resin injection port 26 or otherwise—e.g., frictional flow from movement of the braid form 10.

According to the embodiment illustrated in FIG. 1C, the braid form 10 is passed through the resin composition 18 in the resin bath 34 prior to entering the die block 24 in order to pre-soak the braid form 10. The amount of time during which the braid form 10 is pre-soaked depends on a number of factors including the speed at which the braid form 10 is conveyed through the process and the length of the resin bath 34 traversed by the braid form 10. During the continuous process, the braid form 10 passes through the resin bath 34 and the die block 24 at essentially the same speed. Pre-soaking need only occur for a few seconds (e.g., about 4 seconds or less) in order to achieve benefits imparted thereby. Beneficially, pre-soaking improves processing efficiency by, for example, allowing for conveyance of the braid form 10 at an increased speed, allowing for a decrease in the number of resin injection ports needed, and/or allowing for reduced temperatures and pressures otherwise needed to achieve the same degree of impregnation.

While certain efficiencies are realized by injecting resin composition 18 into a braid form 10 at a positive flow rate, other methods of the invention sufficiently impregnate braid forms 10 by subjecting them to a resin bath 34 for an amount of time adequate to form the braid-reinforced resin composition 20. During contact with the resin bath 34 according to this embodiment, resin composition 18 is allowed to freely impregnate the braid form 10 (i.e., without pressure being applied to "inject" the resin composition 18). The resin bath 34 can optionally be heated.

According to a further embodiment of the method of the invention, the diameter of the braid form 10 is locally increased during at least a portion of the time it is in contact with the resin composition 18 as part of the resin impregnation process. This aspect of the invention is applicable to all methods of the invention, whether they impregnate the braid form 10 using a resin bath, resin injection, or combinations thereof.

Figure 1D:
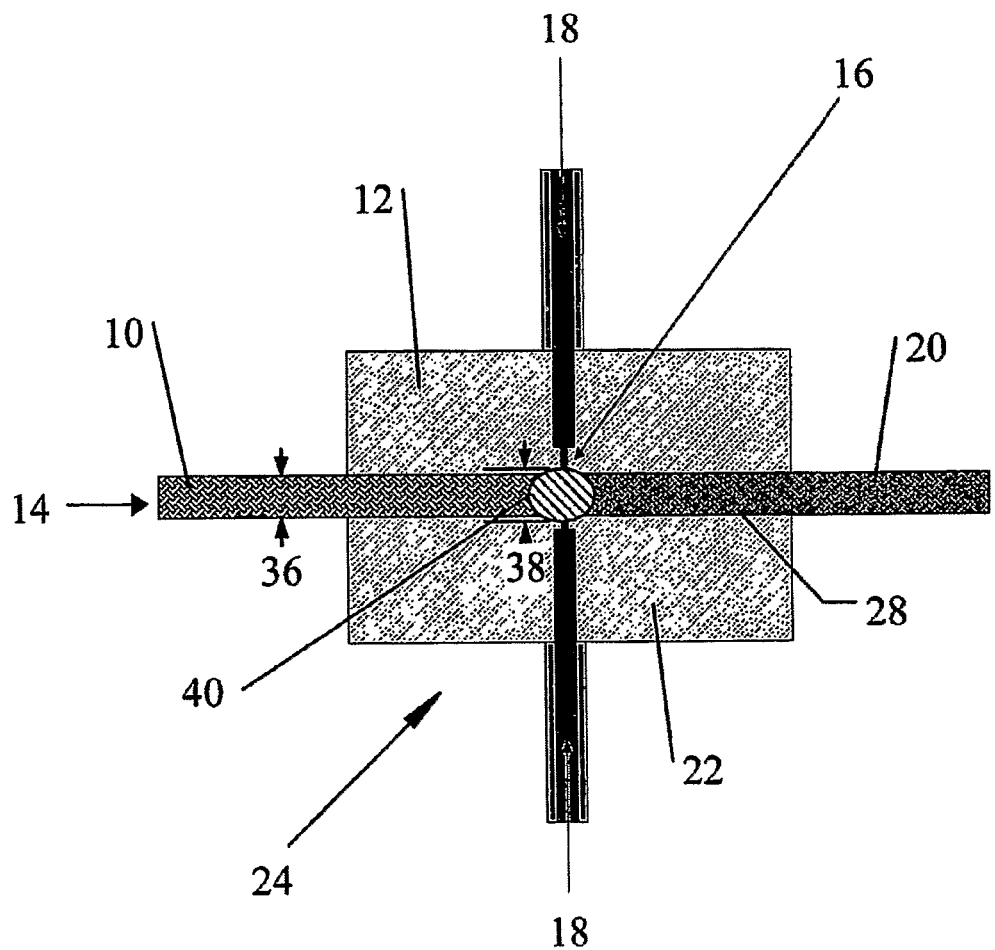
FIG. 1D is a partial schematic of a further embodiment of the process and processing equipment for impregnation of braid forms illustrated in FIG. 1A, wherein the braid form diameter is locally increased during impregnation thereof.

One aspect of this embodiment is illustrated in FIG. 1D. As illustrated therein, the braid form 10 is impregnated using resin injection such as that illustrated in FIG. 1A. As illustrated therein, the initial diameter 36 of the braid form 10 is locally increased to a larger diameter 38 at position 16, which is proximate the resin injection ports. Increasing the braid diameter in this manner was found to improve processing efficiency by facilitating flow of the resin composition 18 through interstices between the individual fiber tows of the braid form 10. To accomplish this local increase in diameter, one or more object 40 internal or external to the braid form 10 is generally used.

Any suitable object 40 can be used to accomplish this purpose. It is to be understood that, when the braid form 10 is longitudinally stretched initially, the local increase in its diameter will be less than that of comparable braid forms 10 initially stretched to a lesser extent. Dimensions and placement of the object will thus vary accordingly. Preferably, diameter of the object 40 is about 50% of the braid form's outside diameter to about 150% of the braid form's outside diameter, as measured in a non-stretched form.

According to an exemplary embodiment, outward pressure is exerted from within the braid form 10 simply by internal placement of an object 40 having a larger diameter than the core diameter of the braid form 10. In this embodiment, the longitudinally stretched braid form 10 is drawn over the object 40 (e.g., ball, ring, disk, or the like) within its core to locally increase the braid form's diameter. The period of time and length over which the increased diameter 38 of the braid form 10 is maintained varies, for example, depending on the desired effects and factoring in the dimensions of various components (e.g., braid form 10, die block 24, object 40, and resin injection port 26). According to one embodiment, the braid form 10 is maintained at the locally increased diameter 38 for about 5% to about 25% of the length of the die block 24.

Exemplary embodiments and applications of the invention are described in the following non-limiting examples.

EXAMPLES

Example 1

A resin composition was prepared by mixing 100 parts by weight EPON 862 (an epoxy resin available from Resolution Performance Products of Houston, Tex.), 22 parts by weight ANCAMINE 2441 (an amine curative available from Air Products and Chemicals, Inc. of Allentown, Pa.), and 5 parts by weight CABO-SIL TS-720 (a fumed silica available from Cabot Corporation of Billerica, Mass.). This composition was impregnated onto a braid form to form a braid-reinforced resin composition of the invention.

Example 2

A resin composition was prepared by mixing 100 parts by weight EPALLOY 8230 (an epoxy resin available from CVC Specialty Chemicals, Inc. of Moorestown, N.J.), 6.6 parts by weight OMICURE DDA 5 (an ultra-micronized grade of dicyandiamide available from CVC Specialty Chemicals, Inc. of Moorestown, N.J.), 0.55 part by weight OMICURE U-52 (an aromatic substituted urea used as an accelerator for dicyandiamide cure of epoxies and available from CVC Specialty Chemicals, Inc. of Moorestown, N.J.), and 5 parts by weight CABO-SIL TS-720 (a fumed silica available from Cabot Corporation of Billerica, Mass.). This composition was impregnated onto a braid form to form a braid-reinforced resin composition of the invention.

Example 3

A resin composition was prepared by mixing 100 parts by weight EPON 862 (an epoxy resin available from Resolution Performance Products of Houston, Tex.), 6.6 parts by weight AMICURE CG-1400 (a micronized grade of dicyandiamide available from Air Products and Chemicals, Inc. of Allentown, Pa.), 4.4 parts by weight AMICURE UR (a substituted urea-based accelerator—1 phenyl 3,3 dimethyl urea—for dicyandiamide-cured epoxy resins available from Air Products and Chemicals, Inc. of Allentown, Pa.), and 5 parts by weight CABO-SIL TS-720 (a fumed silica available from Cabot Corporation of Billerica, Mass.). This composition was impregnated onto a braid form to form a braid-reinforced resin composition of the invention.

Example 4

A resin composition was prepared by mixing 100 parts by weight EPON 862 (an epoxy resin available from Resolution Performance Products of Houston, Tex.), 6.6 parts by weight AMICURE CG-1400 (a micronized grade of dicyandiamide available from Air Products and Chemicals, Inc. of Allentown, Pa.), 4.4 parts by weight (an amine curative available from Air Products and Chemicals, Inc. of Allentown, Pa.), and 5 parts by weight CABO-SIL TS-720 (a fumed silica available from Cabot Corporation of Billerica, Mass.). This composition was impregnated onto a braid form to form a braid-reinforced resin composition of the invention.

Example 5

A resin composition was prepared by mixing 100 parts by weight EPON 863 (an epoxy resin available from Resolution Performance Products of Houston, Tex.), 23.2 parts by weight ANCAMINE 2441 (an amine curative available from Air Products and Chemicals, Inc. of Allentown, Pa.), 10.0 parts by weight EPON 58034 (an epoxy adduct modified with carboxyl-terminated butadiene-acrylonitrile elastomers available from Hexion Specialty Chemicals, Inc. of Houston, Tex.), and 5.25 parts by weight CABO-SIL TS-720 (a fumed silica available from Cabot Corporation of Billerica, Mass.). This composition was impregnated onto a braid form to form a braid-reinforced resin composition of the invention.

Example 6

A resin composition was prepared by mixing 100 parts by weight EPON 863 (an epoxy resin available from Resolution Performance Products of Houston, Tex.), 22.4 parts by weight ANCAMINE 2441 (an amine curative available from Air Products and Chemicals, Inc. of Allentown, Pa.), 2.5 parts by weight of PYROGRAF-III (carbon nanofibers available from Applied Sciences, Inc. of Cedarville, Ohio), and 2.5 parts by weight CABO-SIL TS-720 (a fumed silica available from Cabot Corporation of Billerica, Mass.). This composition was impregnated onto a braid form to form a braid-reinforced resin composition of the invention.

Example 7

A resin system was prepared by mixing 100 parts by weight EPON 863 (an epoxy resin available from Resolution Performance Products of Houston, Tex.) as an initial resin, 22 parts by weight ANCAMINE 2441 (an amine curative available from Air Products and Chemicals, Inc. of Allentown, Pa.), and 5 parts by weight CABO-SIL TS-720 (a fumed silica available from Cabot Corporation of Billerica, Mass.). This composition is capable of being impregnated onto a braid form to form a braid-reinforced resin composition of the invention.

Examples 8A-8D

A series of resin compositions were prepared by mixing 100 parts by weight EPON 863 (an epoxy resin available from Resolution Performance Products of Houston, Tex.) as an initial resin and 22 parts by weight ANCAMINE 2441 (an amine curative available from Air Products and Chemicals, Inc. of Allentown, Pa.). Additionally, in the amount shown in Table 1, CABO-SIL TS-720 (a fumed silica available from Cabot Corporation of Billerica, Mass.) was added to each resin composition.

Approximately 100 grams of the resin composition was placed into a 240 mL (8 ounce) glass jar under ambient temperature conditions. Then, each jar was inverted for a time period of sixty minutes. During this time period, the resin composition within each jar was visually inspected to determine if any flow occurred. As can be seen from the results in Table 1, resin compositions with higher levels of viscosity modifier (i.e., fumed silica) exhibited Bingham plastic fluid properties according to a preferred embodiment of the invention.

TABLE 1

| Example | Amount of Fumed Silica (parts by weight) | Exhibits Bingham Plastic Fluid behavior? |
|---|---|---|
| 8A | 0 | No - Resin flowed immediately |
| 8B | 1 | No - Resin began flowing within 3 seconds of inverting jar |
| 8C | 3 | Yes - Did not flow |
| 8D | 5 | Yes - Did not flow |

Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited. Those of ordinary skill in the art will recognize variations in performing the steps from the order in which they are recited. In addition, it should be noted that the resin composition described herein may comprise all components in one or multiple parts. For example, in one embodiment, the viscosity modifier can be added to the composite structure after the other components of the resin composition are initially impregnated onto the braid form. Other variations are recognizable to those of ordinary skill in the art.

The invention claimed is:

1. A resin composition for preparation of a braid-reinforced composite, the composition comprising: an essentially uncured initial resin comprising at least one thermosetting resin and, optionally, at least one thermoplastic resin; an amount of at least one curative for the thermosetting resin, which amount of curative effectuates cure of the resin composition within about 45 to about 60 minutes when heated to 120° C.; and at least one viscosity modifier; wherein viscosity of the initial resin in the resin composition is less than about 6 Pa·s when tested at 25° C.; wherein the resin composition exhibits Bingham plastic fluid behavior; wherein the resin composition is capable of impregnating a braid form using hot-melt processing; and wherein the resin composition is capable of remaining impregnated throughout the braid form, without partial curing, until final cure of the resin composition to form the braid-reinforced composite.

2. The resin composition of claim 1, wherein the initial resin has a viscosity of about 2.5 Pa·s to about 4.5 Pa·s when tested at 25° C.

3. The resin composition of claim 1, wherein the initial thermosetting resin comprises an epoxy resin.

4. The resin composition of claim 1, wherein the viscosity modifier comprises a thixotropic agent, a nanomaterial, or a combination thereof.

5. The resin composition of claim 1, wherein the viscosity modifier comprises a thixotropic agent.

6. The resin composition of claim 1, wherein the viscosity modifier comprises fumed silica.

7. The resin composition of claim 1, wherein the viscosity modifier comprises a nanomaterial.

8. The resin composition of claim 1, wherein the viscosity modifier comprises a carbon nanomaterial.

9. The resin composition of claim 1, wherein the initial thermosetting resin comprises at least one resin based on diglycidyl ether of Bisphenol F.

10. The resin composition of claim 1, further comprising at least one elastomeric toughening component.

11. The resin composition of claim 1, wherein the resin composition has a glass transition temperature of less than about 200° C. as measurable using Differential Scanning calorimetry.

12. The resin composition of claim 1, wherein the initial resin has a viscosity of less than about 5 Pa·s (50 Poise) when tested at 25° C.

13. The resin composition of claim 1, further comprising at least one detackifying resin selected from waxes, fatty acids, and other release agents.

14. The resin composition of claim 1, wherein the initial resin consists of resin based on diglycidyl ether of Bisphenol F.

15. The resin composition of claim 1, wherein the initial resin consists of thermosetting resin.

16. The resin composition of claim 1, wherein the resin composition has relatively low tack.

17. The resin composition of claim 1, wherein the resin composition is essentially flow-stable during cure.

18. A braid-reinforced resin composition comprising:
a braid form;
the resin composition of claim 1 impregnated throughout the braid form.

19. The braid-reinforced resin composition of claim 18, wherein the resin composition is essentially uncured.

20. A braid-reinforced composite comprising the braid-reinforced resin composition of claim 18, wherein the resin composition is cured.

21. A method of preparing a braid-reinforced composite, comprising:
providing the resin composition of claim 1 in one or multiple parts;
impregnating the braid form with the resin composition of claim 1 to form a braid-reinforced resin composition; and
curing the braid-reinforced resin composition to form the braid-reinforced composite.

22. The method of claim 21, wherein the resin composition is impregnated on the braid form using resin injection hot-melt processing.

23. The method of claim 22, wherein the resin composition is pre-soaked with the resin composition prior to resin injection.

24. The method of claim 21, wherein diameter of the braid form is locally increased during impregnation of the braid form.

25. The method of claim 21, wherein the resin composition remains essentially uncured until fully curing the braid-reinforced resin composition to form the braid-reinforced composite.

26. The resin composition of claim 1, wherein the at least one curative for the thermosetting resin effectuates cure of the resin composition when heated to 100° C.

27. The resin composition of claim 1, wherein about 2% to about 7% by weight of the resin composition comprises one or more viscosity modifiers.

28. The resin composition of claim 1, wherein the at least one curative for the thermosetting resin comprises an aliphatic amine curative.

29. The resin composition of claim 1, wherein the braid form is a tubular braid.

30. The braid-reinforced resin composition of claim 18, wherein the braid form is a tubular braid.

* * * * *